United States Patent [19]
Kyriakis

[11] Patent Number: 5,088,827
[45] Date of Patent: Feb. 18, 1992

[54] MEASURING APPARATUS FOR DETERMINING THE DIMENSION AND POSITION OF AN ELONGATE OBJECT

[75] Inventor: John Kyriakis, London, England

[73] Assignee: Beta Instrument Co., Ltd., High Wycombe, England

[21] Appl. No.: 450,544

[22] Filed: Dec. 14, 1989

[30] Foreign Application Priority Data

Dec. 15, 1988 [GB] United Kingdom ............... 8829250

[51] Int. Cl.$^5$ ............................................. G01B 11/10
[52] U.S. Cl. ..................................... 356/372; 356/373; 356/375; 356/385; 250/560; 250/561
[58] Field of Search ............... 356/372, 373, 375, 384, 356/385, 394; 250/560, 561

[56] References Cited

FOREIGN PATENT DOCUMENTS 0073214 3/1989 Japan ..................... 356/373

*Primary Examiner*—F. L. Evans
*Attorney, Agent, or Firm*—Stanley J. Price, Jr.

[57] ABSTRACT

Apparatus for determining the dimension and position of an elongate object (1) travelling freely in space, for example, a cable being coated in an on-line extrusion process. Two separate out-of-focus images of the object (1) are formed on respective charge coupled devices (5) and (6) positioned on either side of the image plane of the optical system (2, 4) employed. By monitoring variations in the comparative characteristics of the two images caused by object movement and size variation, using conditioning circuits (7) and (8) and an indicator/controller unit (9), the spatial position of the object (1) and its dimensions are determined on a continuous basis whereby it is possible to compensate for inaccuracies in dimensional measurement caused by object movement in space, and to control thereby the extrusion process.

6 Claims, 4 Drawing Sheets

MEASURING APPARATUS FOR DETERMINING THE DIMENSION AND POSITION OF AN ELONGATE OBJECT

BACKGROUND OF THE INVENTION

1. Field Of The Invention

The invention relates to a method and apparatus for monitoring an object to determine its dimension and position in space.

2. Description Of The Prior Art

It becomes desirable in certain continuous processes when producing elongated products such as wires, cables, strips, tubes, glass or metal rods to determine the dimension of the product in the production run.

In some applications it is possible to make contact with the product but there are frequent instances where the product is inaccessible as regards physical contact, for example where the product is passing through a hostile environment.

Methods of non-contact measurement of a moving product are known, which employ optical techniques. However, these methods have proven to be inaccurate because the product is generally moving freely in space and consequently movements from a fixed line of travel will occur which will unavoidably distort the ultimate measurement since the image position, upon which the measurement depends, suffers constant change.

SUMMARY OF THE INVENTION

It is an object of the present invention to overcome the problems of the prior art and to provide a non-contact method and apparatus for determining accurately the dimensions of a product irrespective of movement of the product from its path of travel.

According to the invention there is provided apparatus for monitoring an elongate object travelling freely in space to determine its dimension and position in space comprising optical light source means for providing an image for the object, first scanning means positioned opposite the light source to receive a first image of the object between the light source and the first scanning means and providing output signals representative of movement of the image corresponding to positional movement of the object and/or variation in size, second scanning means positioned adjacent the first scanning means to receive a second image of the object at a different focus than said first image and providing output signals representative of movements of the image corresponding to positional movement of the object and/or variation in size, first means for comparing said signals from each of said first and second scanning means with pre-set signals representative of an invariant position and size and acting as a standard or reference for comparison to determine whether said signals are representative of movement of the position of the object and/or variation in size thereof and providing output signals representative of change of size of the object and its position in space, and second means for comparing said last mentioned output signals with preset signals representative of a nominal size of the object and position in space to provide a measure of the dimension of the object and its spatial position.

Preferably the second comparison means is provided with a feedback capability to compensate the dimensional measurement of the object for image movement caused by positional movement of the object, other than variation in size.

Embodiments of the invention will now be described by way of example with reference to the accompanying drawings.

DESCRIPTION OF THE PREFERRED EMBODIMENTS

Figure 1:
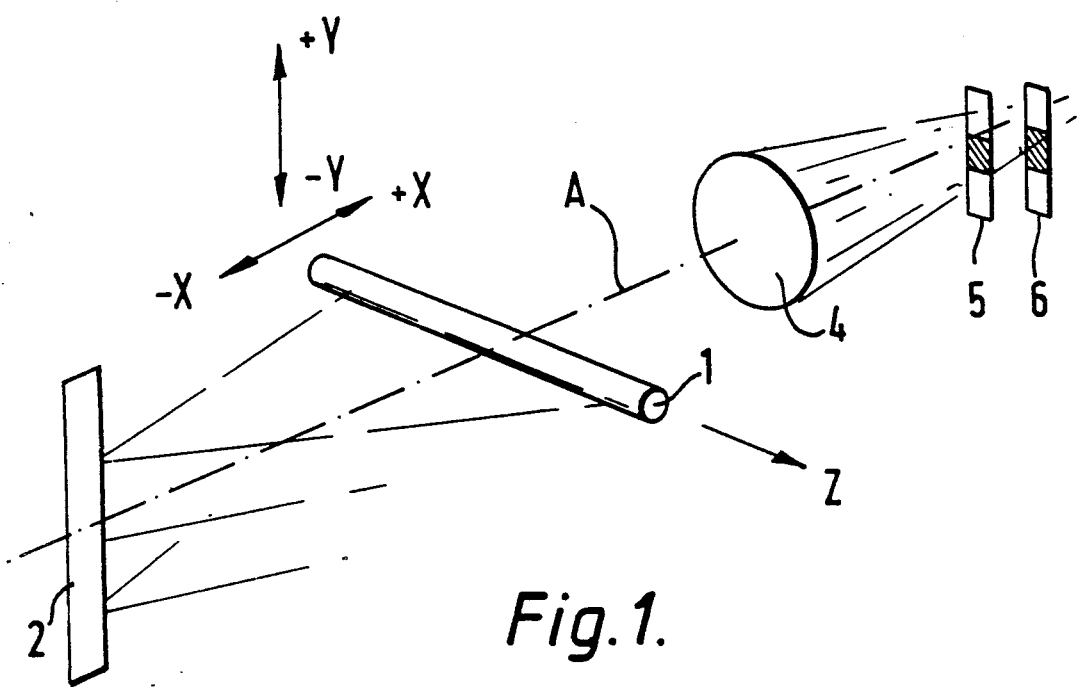
FIG. 1 shows a perspective view of apparatus for measuring the dimensions of a moving product.
Figure 2:
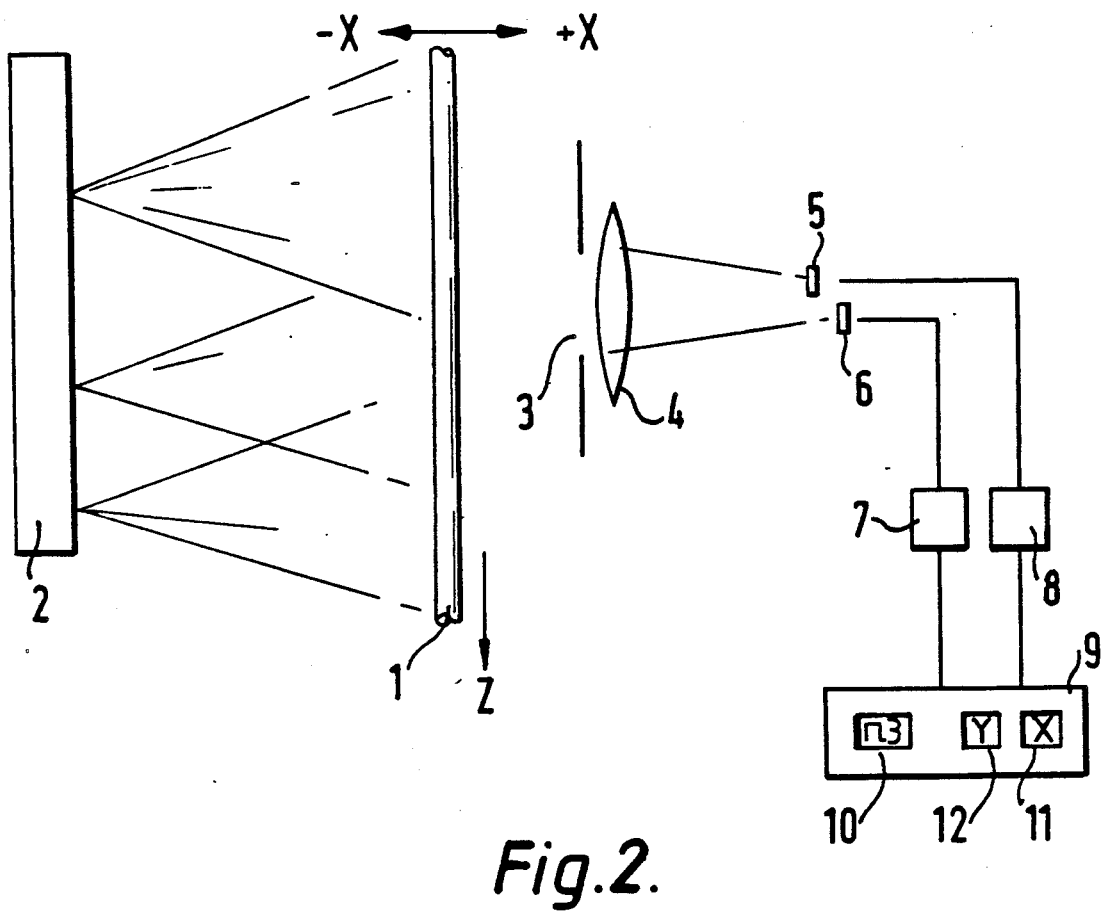
FIG. 2 is a plan view of the system of FIG. 1 connected to measurement read-out devices.

With reference to the drawings consider an object such as a rod or cable 1 moving in the direction 2 of which it is required to measure the outside dimension in the Z plane as shown more particularly in FIGS. 1 and 2.

In order to do this a generalized optical system is shown comprising a light source 2 providing a diffuse beam of light directed across the object 1 to be measured.

A lens 4 intercepts the beam through an aperture 3 and produces a real image of the object 1 on two CCD (charged coupled devices) or linear diode arrays 5 and 6, placed close to the optic axis A of the system.

The CCD's (charged coupled devices) 5 and 6 are displaced in the X plane by a discrete amount such that the image received on CCD 5 differs in size from the image received on CCD 6, and are respectively slightly out of focus.

Normally with such a system as above described the size of the image varies with the position of the object in 1 the A axis. However, if the position of the object in this axis is known then the size of the image can be compensated for to obtain a corrected reading of the size of the object.

If only one CCD array were used then the position of the object away from its nominal center point could be ascertained by the degree to which the image is out of focus. However, it cannot be determined whether this is due to the object being too near or too far from its nominal center position. By using two CCD arrays of slightly differing distances from the image plane then polarity in the X and Y planes as well as the magnitude of positional error may be determined.

As is shown CCD 5 is arranged to be slightly in advance of CCD6 with respect to the nominal image plane. Now when the object is in its nominal center point position along the Z axis, both images are slightly out of focus.

As the object 1 moves away from the lens 4 then the image on CCD5 will become sharper and that on CCD 6 will become less sharp and from this change in image focus it is possible to determine that the object is moving in the −X direction.

Conversely when the image on CCD 6 becomes sharper and that on CCD 5 becomes less sharp then it is possible to ascertain that the object is moving in the +X direction.

The magnitude of the movement can be calculated as long as the size of the lens aperture 3 and its focal length are known. Clearly a larger lens aperture will give a system with higher sensitivity.

Referring to FIG. 2 the electrical outputs of the CCD's 5 and 6 are fed into conditioning circuits 7 and 8 which in turn input signals to an indicator and control unit 9.

The conditioning circuits 7 and 8 are basically electronic memories which store the output signals from the scanning CCD's 5 and 6 representative of positional movement of the image corresponding to increased size of the object or a movement in space or a combination of both.

The conditioning circuits 7 and 8 act to discriminate as between image movements caused by object size variations or positional movement in space.

Figure 6:
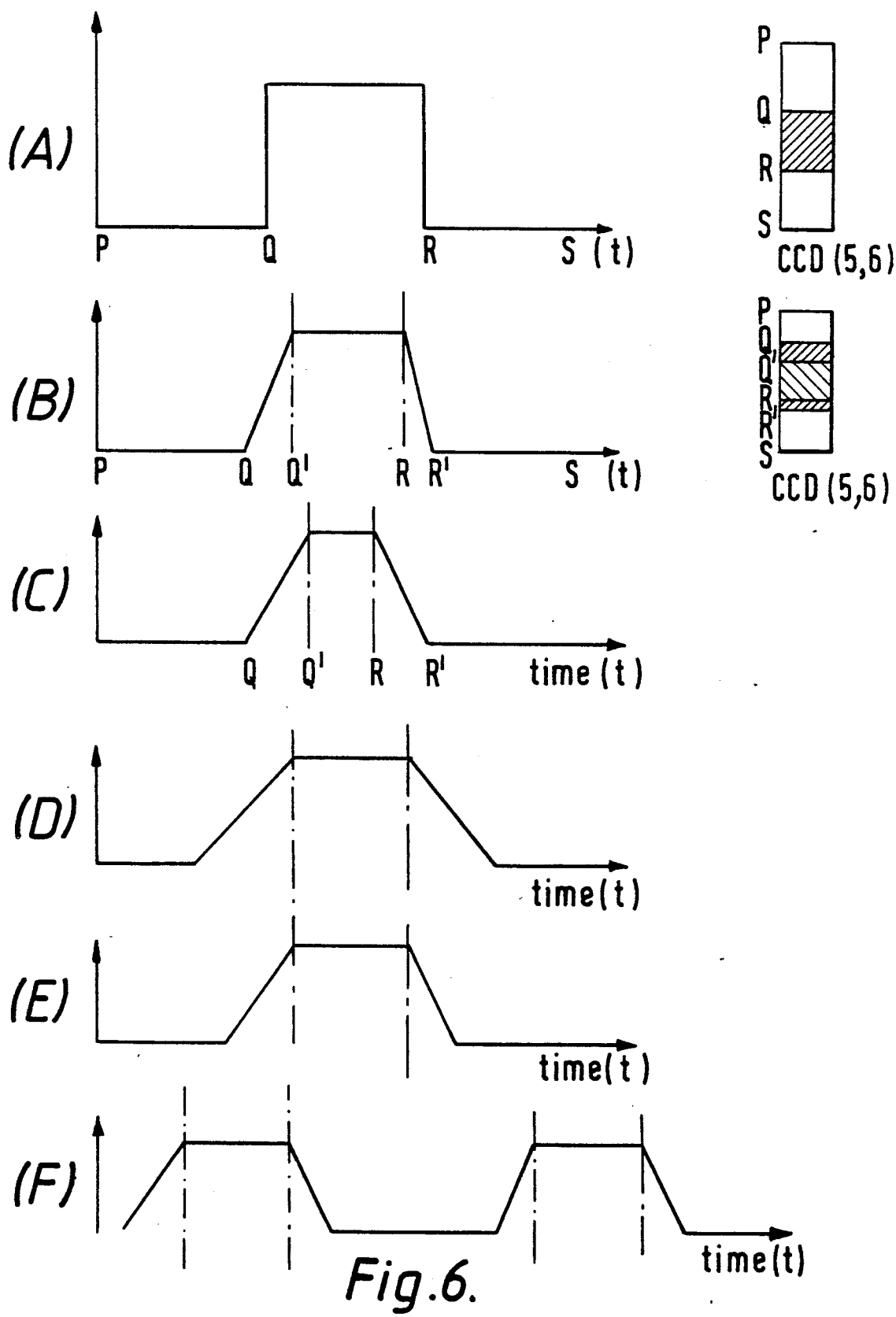
FIG. 6 (A), (B), (C), (D), (E), (F) illustrate a representative sample of output signals from the charged coupled devices of the optical apparatus shown in FIG. 1.

To illustrate representative output signals from the scanning CCD's 5 and 6 reference may be had to FIG. 6.

FIG. 6(A) is a representative square wave output which would be obtained if a single CCD were arranged in the image plane and the image of the object were in focus, or alternatively represents the output which is obtained when the image on either CCD 5 or 6 is in focus. The non-illuminated portion of the CCD represented by the square wave shown in FIG. 6(A) represents a measure in time of the dimension of the object 1. It will be readily seen that if the time measurement represented by the square wave is compared with a calibrated time signal it is possible to deduce the dimension of the product.

As explained earlier inaccuracies occur using a single output with a scanning device in the image plane because it is not possible to determine accurately whether an increase in the square wave output is due solely to an increase in the size of the object and does not include a component due to positional movement as, for example, in the X plane.

FIG. 6(B) shows a wave output from either CCD 5 or 6 of the image of the object on either side of the image plane of the optical system.

The slight blurring of focus which occurs will produce a non-square wave output as shown, the sloping sides corresponding to a blurring of the image produced by the lack of focus and is an represented by time Q to Q1 and R to R1.

The type of wave output from the scanning devices 5 and 6 will determine whether the object has moved in the X or Y planes or has varied in size.

If the object 1 for example has suffered a positional movement in the X plane then the output signals from a respective CCD's 5 and 6 will be of the form shown in FIG. 6(C) and where the image blur represented by Q, Q' and R, R' will have either decreased or increased in time depending on which side of the image plane the respective CCD is placed upon.

However, if the object merely changes in size then the overall width of the wave output on the time axis will either increase or decrease as shown illustratively in FIG. 6(D).

If the object were to move in the Y plane then this will be represented by a complete time shift of the whole wave output from a nominal position as represented in FIGS. 6(E) and 6(F).

It will be readily appreciated that the use of two CCD's 5 and 6 spaced from the image plane as above described renders it possible to determine with accuracy the positional variation of the travelling object 1 and when this occurs compensate for an apparent dimensional measurement which may include a component due to positional movement of the object thereby to provide an accurate dimensional measurement.

Turning to FIG. 2 the indicator and controller 9 examines the electric signals from the two CCD's 5 and 6 and stores the signals in memory. Assuming the product 1 does not move in space the indicator controller 9 is designed to process the information received and following calibration of the unit by known standards, an output representative of the outside dimension of the product 1 may be displayed on a digital display 10, the position of the product 1 in the X plane on a digital display 11 and the position of the product 1 in the Y plane on digital display 12.

If the size of the product 1 suddenly increases but without moving in space, both images formed on the CCD's 5 and 6 will increase proportionately. Hence the indicator controller 9 will compare the increased size with the original size, stored in the memory, and calculate the increase in size of the product 1 which event will then be displayed on digital display 10.

If the product 1 does not change in size but moves, for example, in the X plane, then the images formed on CCD's 5 and 6 will differ in as much as the image on 5 will change disproportionately to the image on 6.

By analyzing the new electrical outputs representative of disproportionality in the indicator unit 9 it is therefore possible to determine that the product has moved along the X axis and did not increase in size. This will then be indicated on display 11. Further, if the product 1 moves in the Y plane the images formed on the CCD's 5 and 6 will move up and down the length of the CCD's and this variation is determined in the controller 9 and indicated on display 12.

If product 1 increases in size and also moves in the X plane the signals from CCD's 5 and 6 will be analyzed by indicator units 9 which will act to correct any errors of product size due to change in position by feeding back a compensation signal to the electronic circuits within indicator 9. A correct readout of the outside dimension of the product 1 will be displayed on display 10 irrespective of product position.

The invention therefore provides a method and apparatus for displaying the accurate overall outer size or dimension of a product in space which is not distorted by travel movements around a nominal axis of travel and is indicated by a read-out of the product position in plane Y as well as the position in plane X on display units 11 and 12.

Figure 7:
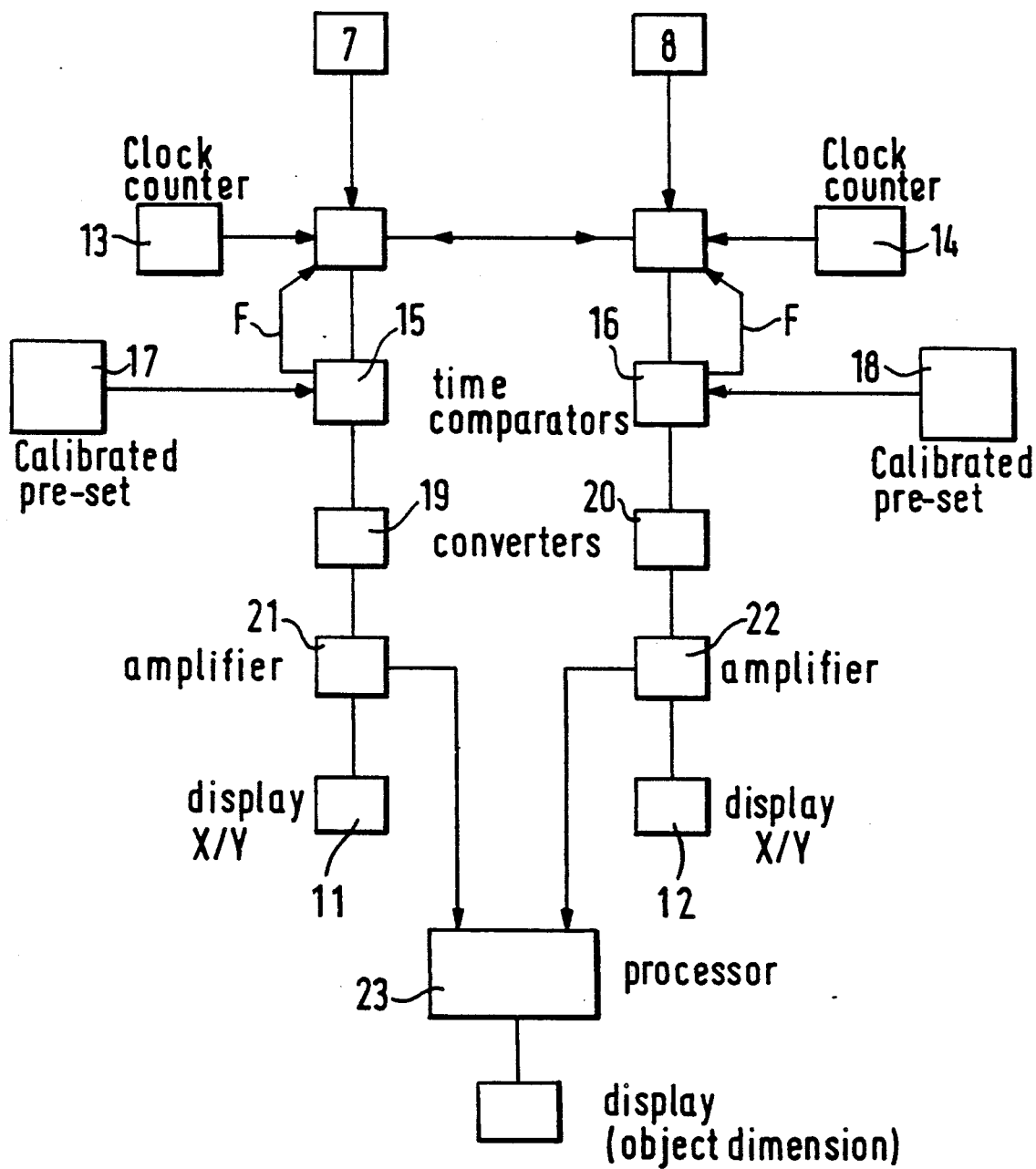
FIG. 7 is an explanatory block diagram illustrating the operation of the conditioning circuits and indicator controller shown in the apparatus of FIG. 1.

A more detailed explanation of the operating components of the conditioning circuits 7 and 8 and indicator controller unit 9 is shown in FIG. 7.

The output signals from the conditioning circuits 7 and 8 are each compared with timing signals in clock counters 13 and 14 providing timing signals representative of invariant position and size of the object to determine that the signals are representative of movement of the position of the object and/or variation in size thereof. These signals are fed to time comparators 15 and 16 and compared in time with calibrated pre-sets 17 and 18 and the output signals therefrom, representative of dimension and spatial position of the object, are converted in converters 19 and 20 to either millimeters or inches or some other equivalent unit of measurement.

The conversion values are then amplified in amplifiers (21, 22) and displayed on displays 11 and 12 to provide positional measurement and are also fed units a processor 23 which is designed to determine the size of the object compensated for positional movement. Such compensation is provided by feedback signals F from the time comparators 15 and 16 to the conditioning circuits 7 and 8 when a determination is made that the output signals from the CCD's 5 and 6 include a component representative of positional movement of the object as well as a size variation thereof.

Figure 3:
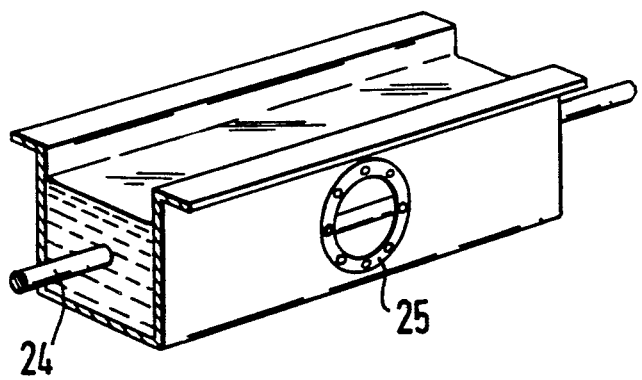
FIG. 3 is a perspective view of a product moving through a hostile environment to illustrate a use of the apparatus of FIGS. 1 and 2.
Figure 4:
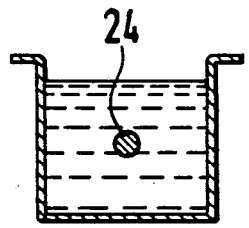
FIG. 4 is a cross sectional view through the trough containing the hostile environment of FIG. 3.

Referring to FIGS. 3 and 4, FIG. 4 is a section of a trough shown in FIG. 3 in which a product 24 is travelling while the product 24 is being cooled in water, oil or other cooling liquid. The method described above is suitable to determine the dimension of this product 24 using porthole 25 without making physical contact with it.

Figure 5:
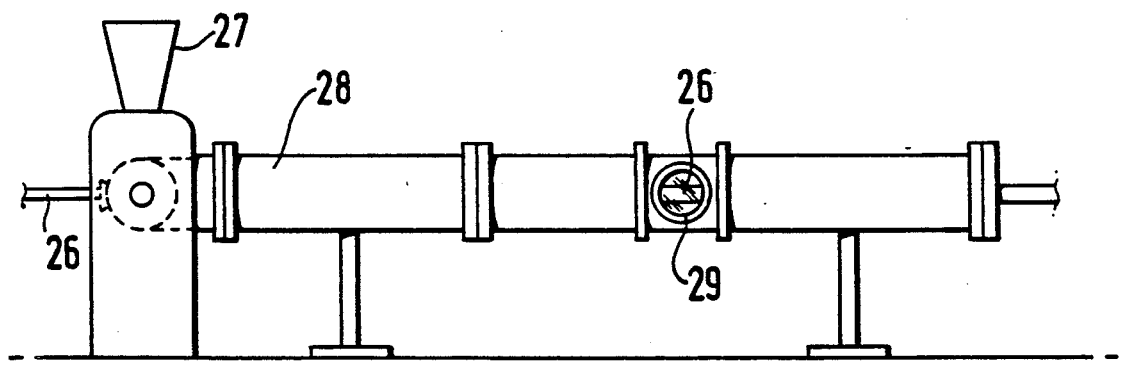
FIG. 5 is a side view of the extrusion process in which the present invention finds an important use.

FIG. 5 shows another application of the invention to an extrusion line in which specialized electrical cable 26 is being coated with a plastics material from an extruder 27. The coated cable is then passed through a steam tube 28 for curing purposes.

In this application it is also required to measure the dimension of the product 26. Hence a special window 29 is designed to look at the product 26 which forms a shadow when viewed against background light. The method described is suitable for measuring the dimension of product 26 which is inaccessible for all intents and purposes, as well as the position of the product within steam tube 28.

Other applications include the measurement of hot products such as glass tubes or rods whereby the temperature of the product is in excess of 1000 degrees Celsius.

According to the provisions of the Patent Statutes, I have explained the principal, preferred construction and mode of operation of my invention and have illustrated and described what I now consider to represent its best embodiments. However, it should be understood that within the scope of the appended claims, the invention may be practiced otherwise than as specifically illustrated described.

I claim:

1. Apparatus for monitoring an elongate object travelling freely in space to determine its dimension and position in space comprising, optical means for providing an image of said object,
    first scanning means positioned to receive a first image of said object and providing output signals representative of movement of said image corresponding to positional movement of said object and/or variation in size,
    second scanning means positioned to receive a second image of said object at a different focus than said first image and providing output signals representative of movements of said image corresponding to positional movement of said object and/or variation in size,
    first comparison means for comparing said signals from each of said first and said second scanning means with preset signals representative of an invariant position and size and functioning as a reference signal to enable determination of whether said signals are representative of movement of the position of the object and/or variation in size thereof when said signals are compared to said reference signal and providing output signals representative of change of size of the object and its position in space,
    second comparison means for comparing said last mentioned output signals with said preset signals representative of a nominal size of said object and position in space to provide a measure of the dimension of said object and its spacial position relative to said invariant position and size,
    said first and said second scanning means being opposite said optical means,
    means for generating a beam of light directed across said object,
    said object being positioned between said optical means and said means for generating a beam of light,
    said first scanning means and said second scanning means not being equidistant from said object,
    a focal point of said image of said object provided by said optical means between said first scanning means and said second scanning means,
    said first and said second scanning means including charged coupled devices,
    said object being positioned in the horizontal plane of a X-axis and the vertical plane of a Y-axis,
    said X-axis and said Y-axis forming X-Y coordinate axes, and
    said first and said second scanning means being in the same horizontal plane.

2. Apparatus as set forth in claim 1 wherein said second comparison means includes feedback means operative to provide compensation signals to correct for errors in said output signals from said first comparison means representative of variation in said object size due to positional movement of the said object.

3. Apparatus as set forth in claim 1 wherein said first comparison means includes means for determining the polarity of said object movement with respect to said X and Y coordinate axis.

4. Apparatus as set forth in claim 1 wherein said optical means is a lens for receiving the beam light cast upon said object to produce an image thereof.

5. A method of monitoring the progress of an elongate object travelling freely in space to determine dimension and position thereof comprising, illuminating the object with light,
    focusing said light received from said object to provide an image thereof,
    scanning a first image of said object and a second image of said object at a differing focus to detect movements of said first and said second images corresponding to positional movements of said object in space and variations in size thereof,
    discriminating between said detected movements in said first and said second images as between movements caused by said object movement in space or size variation,
    comparing said discriminated detected movements with predetermined values representative of a nominal size and position of said object in space,
    calculating from said comparison a measure of dimension of said object and its position in space, and placing a light source on one side of said object and a first and second scanning means on the opposite side of said object wherein said first and said second scanning means are not equidistant from said object and said first and said second scanning means are in the same horizontal plane.

6. Apparatus for monitoring an elongate object travelling freely in space to determine its dimension and position in space comprising, optical means for providing an image of said object, first scanning means positioned to receive a first image of said object and providing output signals representative of movement of said image corresponding to positional movement of said object and/or variation in size, second scanning means positioned to receive a second image of said object at a different focus than said first image and providing output signals representative of movements of said image corresponding to positional movement of said object and/or variation in size, first comparison means for comparing said signals from each of said first and said second scanning means with preset signals representative of an invariant position and size and functioning as a reference signal to enable determination of whether said signals are representative of movement of the position of the object and/or variation in size thereof, when said signals are compared to said reference signal and providing output signals representative of change of size of said object and its position in space, second comparison means for comparing said last mentioned output signals with said preset signals representative of a nominal size of said object and position in space thereof to provide a measure of the dimension of said object and its spacial position relative to said invariant position and size, said first and said second scanning means being opposite said optical means, means for generating a beam of light directed across said object, said object being positioned between said optical means and said means for generating a beam of light, said first scanning means and said second scanning means not being equidistant from said object, a focal point of said image of said object provided by said optical means between said first scanning means and said second scanning means, said first and said second scanning means are linear diode arrays, said object being positioned in the horizontal plane of a X-axis and the vertical plane of a Y-axis, said X-axis and said Y-axis forming X-Y coordinate axes, and said first and said second scanning means being in the same horizontal plane.

* * * * *